(12) United States Patent
Pettersson et al.

(10) Patent No.: US 9,435,645 B2
(45) Date of Patent: Sep. 6, 2016

(54) COORDINATE MEASURING MACHINE (CMM) AND METHOD OF COMPENSATING ERRORS IN A CMM

(75) Inventors: Bo Pettersson, London (GB); Knut Siercks, Mörschwil (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 990 days.

(21) Appl. No.: 13/148,938

(22) PCT Filed: Feb. 11, 2010

(86) PCT No.: PCT/EP2010/051747
§ 371 (c)(1),
(2), (4) Date: Oct. 28, 2011

(87) PCT Pub. No.: WO2010/092131
PCT Pub. Date: Aug. 19, 2010

(65) Prior Publication Data
US 2012/0041712 A1 Feb. 16, 2012

(30) Foreign Application Priority Data
Feb. 11, 2009 (EP) .................................... 09152501

(51) Int. Cl.
*G01B 5/008* (2006.01)
*G01B 7/008* (2006.01)
*G01B 21/04* (2006.01)

(52) U.S. Cl.
CPC .............. *G01B 21/045* (2013.01); *G01B 5/008* (2013.01); *G01B 7/008* (2013.01)

(58) Field of Classification Search
CPC ..... G06F 15/00; G01B 21/045; G01B 21/02; G01B 21/04; G01B 21/042; G01B 21/047; G01B 5/008; G01B 5/004; G01B 7/008; G01B 7/004

USPC ........................................................ 702/151
See application file for complete search history.

(56) References Cited

U.S. PATENT DOCUMENTS

| 4,587,622 A | 5/1986 | Herzog |
| 4,625,408 A | 12/1986 | Wright |

(Continued)

FOREIGN PATENT DOCUMENTS

| CN | 86101800 A | 9/1986 |
| DE | 35 26 919 | 1/1986 |

(Continued)

OTHER PUBLICATIONS

Schwenke et al., Geometric Error Measurement and Compensation of Machines—An Update, 2008, CIRP Annals-Manufacturing Technology 57, pp. 660-675.*

*Primary Examiner* — Toan Le
(74) *Attorney, Agent, or Firm* — Maschoff Brennan

(57) ABSTRACT

The present invention relates to a coordinate measuring machine comprising a stationary base, a probe head, at least one linear drive mechanism for moving in a first direction, the linear drive mechanism having a linear guide and a movable member being supported for movement along the guide by bearings. The linear drive mechanism further comprises at least a first pre-calibrated integral sensor-package having at least two displacement sensors each for measuring a distance from the movable member to the guide in a direction being non-parallel with respect to the first direction, wherein the sensed distances indicate a translational displacement of the movable member from an ordinary bearing position in a direction perpendicular to the first direction and a rotational displacement of the movable member.

17 Claims, 6 Drawing Sheets

(56) References Cited

U.S. PATENT DOCUMENTS

| | | | |
|---|---|---|---|
| 6,668,466 B1* | 12/2003 | Bieg et al. | 33/503 |
| 7,712,224 B2* | 5/2010 | Hicks | 33/502 |
| 7,715,999 B2* | 5/2010 | Kiyotani | 702/95 |
| 8,229,694 B2* | 7/2012 | Nakagawa et al. | 702/95 |
| 2004/0154180 A1* | 8/2004 | Burgschat et al. | 33/706 |
| 2004/0231177 A1* | 11/2004 | Mies | 33/503 |
| 2005/0283989 A1* | 12/2005 | Pettersson | 33/502 |
| 2006/0266100 A1* | 11/2006 | McMurtry et al. | 73/1.79 |
| 2007/0028677 A1* | 2/2007 | McFarland et al. | 73/105 |
| 2007/0151323 A1* | 7/2007 | Merritt, Jr. | 73/12.01 |
| 2007/0220767 A1* | 9/2007 | Pettersson | 33/503 |
| 2008/0065341 A1* | 3/2008 | Ishikawa et al. | 702/95 |
| 2009/0025463 A1* | 1/2009 | McFarland et al. | 73/104 |
| 2009/0301215 A1* | 12/2009 | McDearmon et al. | 73/774 |
| 2009/0326849 A1* | 12/2009 | MacManus | 702/95 |
| 2011/0102808 A1* | 5/2011 | Verdi et al. | 356/614 |

FOREIGN PATENT DOCUMENTS

| | | |
|---|---|---|
| DE | 44 21 301 | 12/1995 |
| EP | 1 559 990 | 8/2005 |
| EP | 1 687 589 | 8/2006 |
| EP | 1 724 548 A | 11/2006 |
| GB | 2 042 719 | 9/1980 |
| GB | 2 425 840 | 11/2006 |

* cited by examiner

COORDINATE MEASURING MACHINE (CMM) AND METHOD OF COMPENSATING ERRORS IN A CMM

FIELD OF THE INVENTION

The present invention relates generally to a coordinate measuring machine (CMM) for determination of at last one space coordinate of a measurement point and to a method of compensating errors in a coordinate measuring machine (CMM).

BACKGROUND

It is common practice after workpieces have been produced to inspect them on a coordinate positioning apparatus, such as a coordinate measuring machine (CMM) having a movable probe head within a working volume of the machine.

In a conventional three-dimensional measuring machine, the probe head is supported for movement along three mutually perpendicular axes (in directions X, Y and Z).

In a simple form of the machine a suitable transducer mounted parallel to each axis is able to determine the position of the probe head relative to a base of the machine and, therefore, to determine the coordinates of a measurement point on an object being approached by the probe.

There are several possible sources of error if such a technique is employed. Lack of straightness in movement and of orthogonality of the axes is one major cause of such errors. A further cause of error is the angular rotation of the carriages about axes perpendicular to their directions of movement. Such errors, often referred to as Abbé errors, depend not only upon rotation but also upon a lateral offset in the linear drive mechanisms.

Particularly, the following error factors may occur:
scale errors on axes,
horizontal straightness errors on axes,
vertical straightness errors on axes,
pitching errors on axes,
yawing errors on axes,
rolling errors on axes, and
angular errors between axes.

Many attempts have been made to provide correction for the various sources of error referred to. For example, it is known to introduce a deliberate and known error into the transducers by various means. However, such corrections only apply for a given location in the measuring volume. An alternative technique is to calibrate the machine, measuring the errors existing at various points and storing these so that they may be applied when the machine is actually used. As may be imagined, such a calibration process is lengthy, especially for a large machine. However, any "settling" of the machine during use would invalidate the calibrations. Another drawback with the calibration methods is that they will only take care of fully repeatable errors. It is also necessary to calibrate the probe during the same conditions as in the working state of the machine. This means that if the machine runs with 100 mm/sec, the calibration procedure also should be performed with that speed, and if—by some reason—a change of the running speed is necessary, a recalibration of the machine with this new speed would be required.

Another aspect which has to be considered is that accelerations of the probe cause dynamic deflections of the coordinate measuring machine which in turn cause measurement errors. These measurement errors may be reduced by taking measurements at low accelerations. However, productivity demands an increased throughput as well as an increased inspection speed. Hence, the probe experiences higher accelerations during the measurements and larger dynamic structural deflections of the system result. This causes inaccurate reporting of the X,Y,Z geometric position of the probe.

In particular, some coordinate measuring machines exhibit significant drive vibration at high speed. The main source of error causing the vibration is the machine mechanical drive system. Errors caused by these vibrations (typically above 5 Hz) are not suitable for calculative methods of compensation for dynamic errors described above as the vibration causes non repeatable behaviour at high speed which causes measurement errors.

Furthermore, a variety of probes are employed in a coordinate measuring machine for measurements within the scale coordinate system, which includes reference scales arranged along axes that configure the three-dimensional measuring space. To provide the coordinate measuring machine with an improved measurement precision, a structure thereof is required to have a high static stiffness. In addition, introduction of a software spatial precision correcting technology can reduce geometrical errors as low as possible to support higher precision.

Exemplary, EP 1 559 990 discloses a coordinate measuring system and method of correcting coordinates measured in a coordinate measuring machine. Thereby, geometrical errors are measured while works with various weights are mounted on the coordinate measuring machine. Compensation parameters are derived from measured results per a weight of a work and stored. A compensation parameter corresponding to a weight of a work to be measured is appropriately read out to correct measured coordinates of the work to be measured.

As a further example, EP 1 687 589 discloses a method of error compensation in a coordinate measuring machine with an articulating probe head having a surface detecting device. The surface detecting device is rotated about at least one axis of the articulating probe head during measurement. The method comprises the steps of: determining the stiffness of the whole or part of the apparatus, determining one or more factors which relate to the load applied by the articulating probe head at any particular instant, and determining the measurement error at the surface sensing device caused by the load.

Also, GB 2 042 719 discloses a measuring apparatus having three mutually perpendicular axes, wherein errors due to rotations about the various axes are corrected.

Another approach for error correction of work piece measurements with a coordinate measuring machine (CMM) is disclosed in GB 2 425 840. Thereby, position measurements are taken with a work piece sensing probe, in which means of measuring acceleration are provided. The measurements are corrected for both high frequency (unrepeatable) errors such as those due to vibration, and low frequency (repeatable) errors such as those due to centrifugal forces on the probe. The correction method comprises measuring the work piece, determining repeatable measurement errors from a predetermined error function, error map or error look-up table, measuring acceleration and calculating unrepeatable measurement errors, combining the first and second measurement errors to determine total errors and correcting the work piece measurements using the total errors. The predetermined error map is calculated using an artefact of known dimensions.

It is also known to use accelerometers fitted in the probe (or Z-column) of the machine and in the base table (for a differential measurement). The displacements and errors of the probe-position are measured with double integration, and from that it will be possible to adjust the reading with the difference between the double integrated signal and the scales.

However, when using accelerometers, they will usually become noisy when the frequency is relatively low. This can give a bad signal to noise ratio. Furthermore, it may only be possible to measure differences during acceleration, which means that—in general—it may be necessary to calculate the acceleration from the scale position and to compare it with the measured acceleration, and double integrate the difference. However, this may not be enough information to accurately calculate the exact position of the probe. Using such a method also doesn't allow measuring static changes (i.e. friction in combination with dynamic changes will not be considered).

SUMMARY

It is therefore an object of the present invention to provide an improved coordinate measuring machine CMM and method, wherein errors caused by dynamic affects (i.e. when running a high speed scanning) as well as errors caused by week structures or static changes (e.g. changes introduced by friction) can be compensated for in an improved manner.

In particular, displacement errors in each linear drive mechanism (in the X,Y,Z directions) of the CMM should be recognized precisely.

This object is achieved by realising the features of the independent claims. Features which further develop the invention in an alternative or advantageous manner are described in the dependent patent claims.

The present invention relates to a coordinate measuring machine (CMM) for determination of at least one space coordinate of a measurement point on an object to be measured. The CMM comprises at least a stationary base (particularly a measurement table for supporting the object to be measured), a probe head being moveable relative to the base and at least one linear drive mechanism for provision of movability of the probe head relative to the base in a first direction.

Thereby, the linear drive mechanism has a linear guide in the first direction, a movable member being supported for movement along the guide by bearings and a linear measuring instrument for determination of a first drive position of the movable member in the first direction.

A calculation unit determines the space coordinate of the measurement point as a function of at least the first drive position of the movable member of the drive mechanism.

According to the invention, the linear drive mechanism further comprises at least a first pre-calibrated integral sensor-package having at least two displacement sensors each being built for measuring a distance from the movable member to the guide in a direction being non-parallel with respect to the first direction. The sensed distances may in particular be bearing distances between facing surfaces of the movable member and the guide. The displacement sensors of the package are designed and arranged in such a way that the sensed distances indicate a translational displacement of the movable member from an ordinary bearing position in a direction perpendicular to the first direction and a rotational displacement of the movable member.

Therein, the space coordinate of the measurement point is determined also dependant on the indicated displacements.

This means that the translational and rotational displacements are further used by the calculation unit for determining the space coordinate of the measurement point. Particularly, the space coordinate is corrected according to the respective sensed displacements in the at least one drive mechanism.

According to the generic art of CMMs, preferably there may exist three linear drive mechanisms for provision of movability of the probe head relative to the base in three mutually perpendicular directions, namely a first, a second and a third direction (X,Y,Z).

Each of these linear drive mechanisms may comprise a linear guide in the respective direction (X,Y,Z), a movable member being supported for movement along the respective guide by bearings and a linear measuring instrument for determination of the first, the second and the third drive position of the movable member in the first, the second respectively the third direction (X,Y,Z).

For example, the CMM has a base, on which a portal—being supported by bearings—is arranged so that it can be moved in the longitudinal direction (Y direction). The portal may have two portal legs/feet, which are connected by a bridge at their upper ends, the bride forming the x-axis. An X-carriage, which can be driven along the bridge in the X direction, may be arranged thereon. A ram or Z-column can be shifted in a third space direction (Z direction). The Z-column may be supported for movement in the Z direction by bearings, which may be integral with X-carriage.

According to the invention, the integral sensor-package may comprise a housing being common for the particular distance sensors and holding the particular distance sensors together with precisely known positional and spatial relationship relative to each other. Therefore, each particular distance sensor may be mounted to or integrated into the common housing, thus forming the integral sensor-package.

Particularly, the sensor-package is built modular and forms one coherent component in such a way that it is mountable to and removable from the coordinate measuring machine en bloc (which means as a whole). This allows for a modular approach, which means that the sensor-package may be built in such a way that it can easily be installed to and deinstalled from the a CMM-bearing. Exemplarily, the CMM-bearings (for example the carriage on the side of its bearing surface) may comprise a receptacle/socket specially formed for receiving the sensor-package. For example, the sensor-package and the socket may be designed to be connectable by means of a snap-fit connector. Accordingly, the sensor-package, which also can be regarded as a sensor-module, may easily be installed, exchanged and maintained by clicking out a decalibrated, broken or old sensor-module which has outlived its usefulness and clicking in a recalibrated, repaired or new sensor-module.

The housing of the sensor-package, which holds and rigidly joints together the sensors of the package with precisely known positional relation relative to each other, may be designed from material being highly resistant against deformation caused by temperature, pressure, humidity, aging or similar factors. Therein, the housing may comprise a frame structure built up from bracing struts for interconnecting the particular sensor elements with high geometrical stability. Exemplarily, the whole housing of the sensor package or the frame structure may consist of or comprise invar or carbon fiber material.

The advantage with integral sensor-packages having two or three displacement sensor elements is that they may be considerably less sensitive to weakness in the carriage itself (i.e. almost independent from weaknesses in the carriage itself) and the assembly and calibration of the sensor packages—compared to the assembly of individual displacement sensors—may demand less effort. Furthermore, the calibration of the individual sensor elements—particularly with respect to a positional relationship relative to each other—may even be carried out before assembling the integral sensor-package to the CMM.

Particularly, in case of a separate arrangement of several independent distance sensors (not an interconnecting sensor-package) where each individual sensor is attached to the carriage at different positions/locations, it is not possible to distinguish between a deformation (e.g. twist or bending) in the carriage structure and a displacement of the whole carriage relative to the guide (e.g. translational displacement, nick or roll of the CMM-leg relative to the CMM-table). Hence, it could be the case that a deformation (e.g. twist or bending) of the carriage itself would falsely be interpreted (based on a distance-change sensed by one of the installed independent sensors) as displacement of the carriage from the ordinary bearing position and an erroneous compensation in the determination of the tip-probe position would result.

Contrarily thereto, the present invention allows—e.g. by choosing stiff and geometrically stable material for the package-frame/-housing—that the sensors can be bonded together by the package-frame/-housing with high positional and geometrical stability, so as to enable a precisely known and stable positional relationship of the sensors relative to each other, even in case of a deformation in the structure of the carriage itself. Hence, a change in the output of the distance sensors properly indicates the displacement of the carriage of its ordinary bearing position which is considered for determining the coordinates of the probe head; and a pure deformation in the structure of the carriage itself—at least up to a specific extend—does not lead to the false interpretation of a displacement, as—despite of the deformation—the relative read-outs of the distance sensors don't change.

Particularly, the sensor-package may advantageously be attached to the movable member (i.e. the carriage) at that location where the main forces being responsible for displacements act. For example, regarding the x-drive-carriage being part of the CMM-foot at the end of the CMM-leg (which is movable with respect to the measurement table), the sensor-package may be assembled to the bottom side of the carriage at the location being directly below or near below the mass centre of the CMM-leg.

As a further advantage, the material of the carriage may be chosen differently from the material of the sensor-package-housing. Exemplarily, the material of the carriage structure may be optimized with regard to its properties for gliding/sliding along the guide and not with regard to its geometrical stability. Hence, it is possible to only chose an expensive and high quality material (i.e. regarding stiffness and geometrical stability) for the frame of the sensor-package, whereas for the carriage structure itself a less extensive producible and cheaper material may be chosen (e.g. being optimized with regard to its gliding properties).

The invention of rigidly interconnected sensors within one package has several technical effects and advantages compared to a separate arrangement of several independent distance sensors:

- Almost independent from weaknesses in the carriage structure itself;
- The sensors can be calibrated in a dismounted stage of the sensor-package, e.g. the sensors of the package can be pre-calibrated before assembling to the CMM as well as re-calibrated with less effort by removing the package, calibrating the sensors in the dismounted stage and easily clicking the package back into the receptacle again;
- Easy and low effort necessitating assembly to the CMM as two or three sensors (being part of one sensor-module) can be commonly installed within one step;
- Modularity and adaptability according to the actual requirements and targeted costs, so that a sensor-package comprising two sensors can easily be exchanged with another sensor-package comprising e.g. three sensor elements or, as another example, so that a sensor-package comprising several optical sensors can easily be replaced by a sensor-package comprising several capacitive sensors;
- The material of the carriage structure may be optimized with regard to its gliding/sliding properties (enabling improved sliding along the guide) and not with regard to its geometrical stability, which also may allow for a less extensive (and cheaper) production of the CMM;
- Enables optimising the compromise between the issue that the sensors should be placed on the carriage as far away from each other as possible in order to increase the accuracy for sensing displacements of the carriage and the issue that the sensors should be placed as closed to each other so as to allow for best geometrical stability between the sensor elements (i.e. so as to precisely being aware of the spatial relationship of the sensors relative to each other).

According to a particular embodiment of the present invention, all drive mechanisms of the CMM comprise at least one sensor-package with at least two displacement sensors for indicating displacements in the respective drive mechanism, i.e. a displacement of the movable member from an ordinary bearing position.

Hence, in case of three drive mechanisms, the calculation unit may be designed for determining the three space-coordinates of the probe head as a function of the first, the second and the third drive position as well as dependant on the sensed displacements of each moving member. The sensed displacements are used for example in order to compensate errors caused by dynamic affects (i.e. when running a high speed scanning) as well as errors caused by weak structures or static changes (e.g. changes introduced by friction).

In particular, the linear guide of each drive mechanism may comprise a first and a second surface building an edge being parallel with the guiding direction. Also the movable member—i.e. carriage—has first and second surfaces which are mutually facing towards the two surfaces of the linear guide. The movable member may be supported for movement along the guide by air bearings, so that there is an air cushion between the mutually facing first surfaces and the mutually facing second surfaces. In the above described manner, the movable member may be provided for linearly guided movability.

In particular embodiments of the invention, two, three, four or five displacement sensors being integrated into one or two sensor-packages may be arranged in and used for each drive mechanism.

By using the outputs of two displacement sensors in each drive mechanism, not only a lateral displacement (i.e. a bearing distance) may be detected, but also a rotational displacement (i.e. rolling, pitching or yawing) or alternatively a second lateral displacement—dependant on the positions where the displacement sensors are arranged—can be sensed and used for error compensation when determining the space coordinates. For example, two displacement sensors (being part of one sensor-package) may be placed spaced apart from one another on the first surface of the carriage facing towards a guiding surface of the guide. In this case, a rotational displacement may be determined by evaluating a difference between the values measured by the displacement sensors. Alternatively, by combining the outputs of one displacement sensor arranged on a first surface and another displacement sensor arranged on a second surface of the carriage, wherein the surfaces facing towards the two guiding surfaces of the guide, a horizontal straightness error of the carriage perpendicular to the guiding direction and also a vertical straightness error (two translational displacements) can be determined.

Using the outputs of three displacement sensors, one translational and two rotational displacements or one rotational and two translational displacements—dependant on the positions where the displacement sensors are arranged—may be sensed and used for compensating errors caused by the respective displacements from the ordinary bearing position of the carriage.

Similarly, the use the outputs of four displacement sensors can provide for measuring one lateral and all three rotational displacements or two lateral and two rotational displacements—dependant on the positions where the displacement sensors are arranged.

By using the outputs of five displacement sensors, three thereof integrated in a first sensor-package being arranged on the first surface of the carriage and two thereof integrated in a second sensor-package being arranged on the second surface of the carriage, may provide for sensing a horizontal straightness error of the carriage perpendicular to the guiding direction, a vertical straightness error, a pitching error, a yawing error and a rolling error. Hence, with addition of the already existing linear measuring instrument for sensing the drive position of the carriage in the linear moving direction, the spatial position and orientation of the carriage—with six degrees of freedom—may be determined. The determined displacements of the carriage from the ordinary bearing position may be used to directly correct the drive position of the linear measuring instrument, and/or may be used to correct the space coordinates of the approached measurement point.

Therefore, according to the invention, low stiffness in the guide, the carriage and/or the joints may be compensated by additional displacement measurements and therefore will not impact the accuracy and it will always be possible to calculate the "true position" by using the 6-degrees of freedom information from the displacement sensors.

Besides weaknesses in the joints, dynamic deflections or a lack of straightness in movement, another exemplary cause for displacements of the carriages may be a variation of the magnetic force of the linear drive motors when used to drive the carriages along the guides.

Summed up, by measuring distances between the carriage and the guide according to the inventive idea, displacements—i.e. translation and rotation—of the travelling member (carriage) can easily be sensed and determined. As advantage with respect to the state of the art, the method can be used for compensating static changes (changes introduced by friction, etc.) as well as dynamic effects.

Furthermore, errors regarding the bearing position of the travelling member may be sensed very precisely and may be applied for compensation without complicated evaluation and calculation processes.

The displacement sensors may particularly be designed as non contact sensors (e.g. optical, capacitive or inductive), since they will not damage the guiding surfaces.

BRIEF DESCRIPTION OF THE DRAWINGS

The invention will be explained in greater detail below with reference to examples of possible embodiments shown schematically in the drawings, in which.

DETAILED DESCRIPTION

Figure 1:
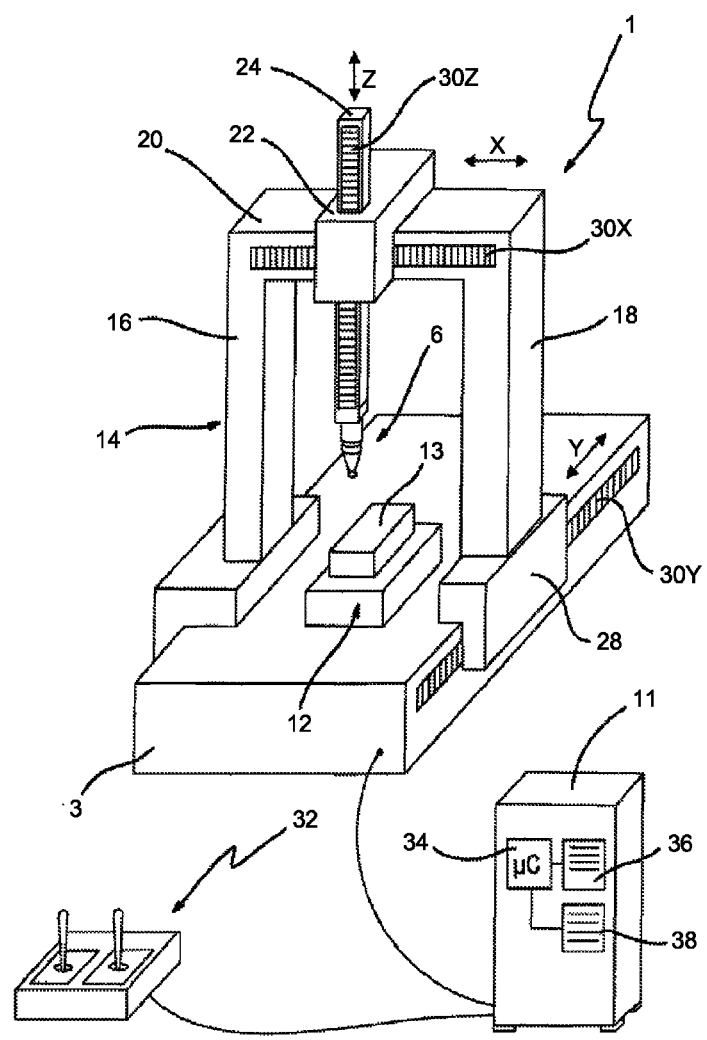
FIG. 1 shows an—exemplarily bridge-type—coordinate measuring machine according to the invention.

In FIG. 1, an exemplary embodiment of the coordinate measuring machine 1 according to the invention is depicted.

The coordinate measuring machine 1 has a base 3, on which a portal 14—being supported by bearings—is arranged so that it can be moved in the longitudinal direction (Y direction). The portal 14 has two portal legs 16,18, which are connected by a bridge 20 at their upper ends.

An X-carriage 22, which can be driven along the bridge, i.e. in a space direction connecting the two portal legs 16,18 (X direction), is placed on the bridge 20. A ram or Z-column 24 can be shifted in a third space direction (Z direction). Therefore, the Z-column 24 is supported for movement in the Z direction by bearings, e.g. air bearings, which are integral with X-carriage 22. The three space directions X, Y and Z are preferably orthogonal to one another, although this is not necessary for the present invention.

Summed up, the coordinate measuring machine 1 is built for determination of three space coordinates of a measurement point 13 on an object 12 to be measured and, therefore, comprises three linear drive mechanisms for provision of movability of the probe head 6 relative to the base 3 in the first, second and third direction (X, Y and Z direction).

Each linear drive mechanism has a linear guide, one in the first, one in the second and one in the third direction (X, Y and Z direction), respectively. In particular, the linear guide of the Y direction drive mechanism is formed by two edge-building surfaces of the base 3, the linear guide of the X direction drive mechanism is formed by two or three surfaces of the bridge 20 and the linear guide of the Z direction drive mechanism is formed by a cubical hole in the X-carriage member.

Furthermore, each linear drive mechanism comprises a movable member being supported for movement along the guide by bearings. In particular, the movable member of the X direction drive mechanism is embodied as Y-carriage 28 having mutually facing surfaces with respect to the above mentioned two guiding surfaces of the base 3. The movable member of the X direction drive mechanism is embodied as X-carriage 22 having mutually facing surfaces with respect to the above mentioned two or three guiding surfaces of the bridge 20. And, the movable member of the Z direction drive mechanism is formed by Z-column 24 having mutually facing surfaces with respect to the inner surfaces of the cubical hole in the X-carriage 22.

Moreover, each linear drive mechanism comprises a linear measuring instrument for determination of a first, a second or a third drive position, respectively, of each movable member in the first, the second or the third direction (X, Y and Z direction), respectively.

A probe head 6, on which a stylus is arranged exemplarily, is fastened on the lower free end of the Z-column 24. The stylus is used in a manner known per se for touching the object 12 to be measured. However, the present invention is not restricted to a tactile coordinate measuring machine and may likewise be used for coordinate measuring machines in which a measurement point is approached in a non-contact manner, i.e. for example a coordinate measuring machine with an optical scanning head. More generally, the probe head 6 may be designed for arranging a contact probe, e.g. a scanning or touch trigger probe, or a non-contact probe, particularly an optical, capacitance or inductance probe.

Figure 8:
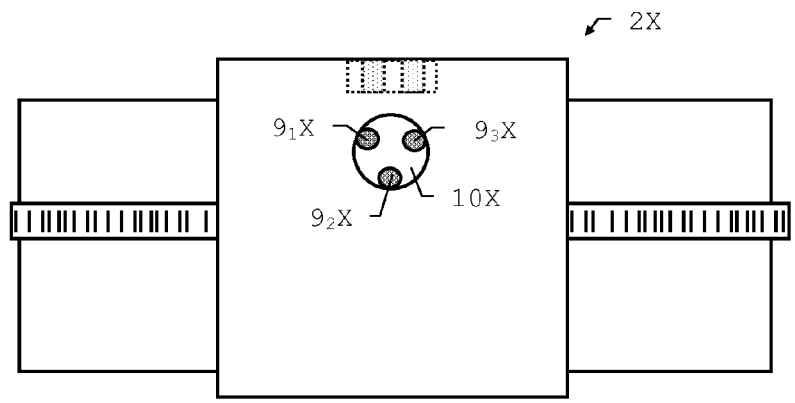
FIG. 8 shows—similarly to FIG. 5—another front view of a linear X-drive mechanism with an alternative embodiment for the sensor-package.
Figure 9:
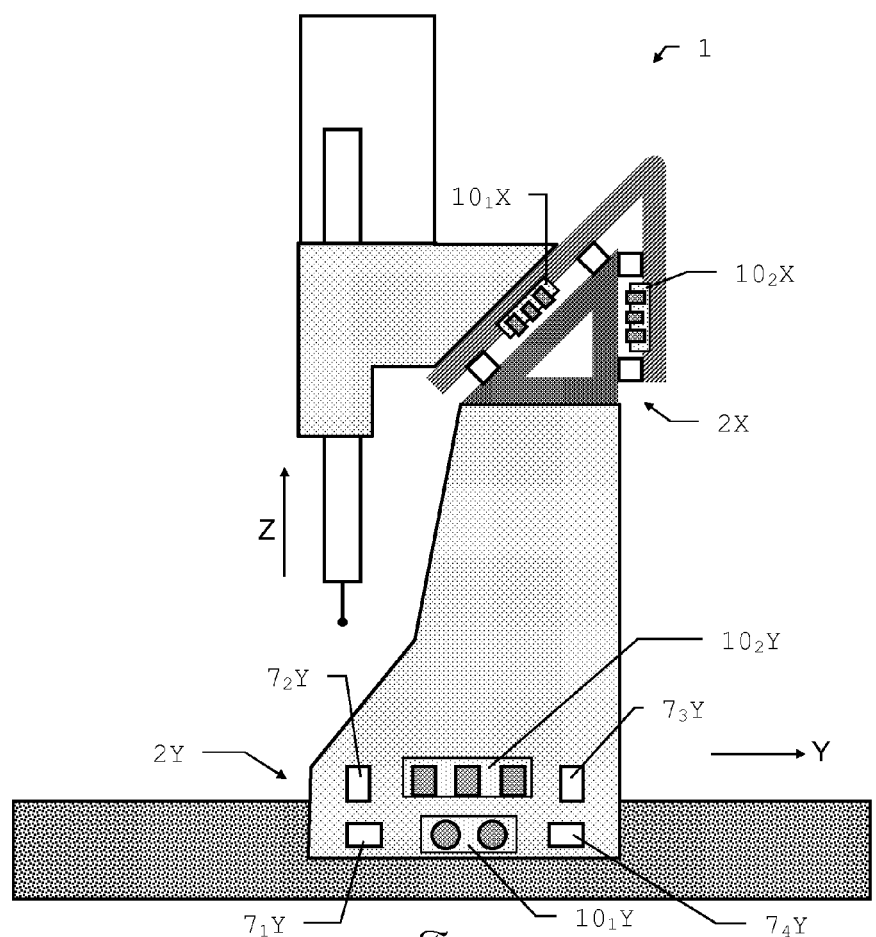
FIG. 9 shows a side view of a bridge-type CMM, according to the invention, having several sensor-packages installed in the linear drive mechanisms.

Furthermore, the invention is not restricted to a coordinate measuring machine in the portal bridge design as shown here. It may equally be used for coordinate measuring machines in gantry design as depicted in FIGS. 8 and 9, in which only the bridge 20 with two supports, functioning as very short feet, can travel along two highly placed fixed rails. Moreover, the invention may generally be used for all coordinate measuring machines, e.g. bridge-type, L-bridge-type, horizontal-arm-type, cantilever-type, gantry-type, etc.

In this exemplary embodiment of FIG. 1, the portal legs 16,18 each have a movable Y-carriage 28 which allow movement of the portal 14—including bridge 20—in the Y direction.

A measuring scale 30Y being part of the Y-measuring instrument is schematically represented on the long side of the base 3, wherein the scale 30Y extends parallel to the Y direction. The scale may be a glass measuring scale, e.g. having incremental or absolute coding, with which a drive position in the Y direction of the Y-carriage 28 can be determined. It is to be understood that the measuring instrument may furthermore contain suitable sensors for reading the measuring scale 30Y, although for the sake of simplicity these are not represented here. However, it should be pointed out that the invention is not restricted to the use of glass measuring scales, and therefore may also be used with other measuring instruments for recording the drive/travelling-positions of the movable members of the drive mechanisms.

Another measuring scale 30X is arranged parallel to the X direction on the bridge 20. Finally, another measuring scale 30Z is also arranged parallel to the Z direction on the Z-ram 24. By means of the measuring scales 30X,30Z as part of the linear measuring instruments, it is possible to record the present drive positions of the X-carriage 22 in X direction and of the Z-column 24 in the Z direction metrologically in a manner which is known per se.

In the shown embodiment, the base 3 comprises a table with a granite surface plate for supporting an object 12 to be measured, on which the space coordinates of the measurement point 13 are intended to be determined.

Also shown is a control and calculation unit 11, which is designed to actuate the drives of the coordinate measuring machine 1 so that the probe head 6 travels to the measurement point 13. For manual operation, the control unit 11 may be connected to a user console 32. It is also possible for the control unit 11 to fully automatically approach and measure measurement points 13 of the object 12 to be measured.

The control and calculation unit 11 contains a processor 34 and a plurality of memories 36,38. In particular, the control and calculation unit 11 is designed for determining the three space-coordinates of the measurement point 13 on the object 12 as a function of at least the first, the second and the third drive position of the three drive mechanisms.

According to the invention, as shown in more detail in the following figures, at least one linear drive mechanism further comprises at least a first sensor-package having at least two displacement sensors for measuring distances from the movable member to the guide in a direction being non-parallel with respect to the drive direction, in particular bearing distances between facing surfaces of the movable member and the guide. Thereby, the sensed distances indicate translational and/or rotational displacements of the movable member from an ordinary bearing position. The displacements may namely be horizontal straightness errors on axes (i.e. a displacement in a direction perpendicular to the travelling direction of the carriage), vertical straightness errors on axes, pitching errors on axes, yawing errors on axes and/or rolling errors on axes.

The thereby sensed displacement or displacements, hence, may further be used, for example, in order to directly compensate for scale errors in connection with determination of the travelling positions by the linear measuring instruments and/or compensate for the sensed horizontal straightness errors, vertical straightness errors, pitching errors, yawing errors and/or rolling errors of the moving members in connection with the calculation of the position of the probe head by the control and calculation unit 11 (i.e. when deriving the space coordinate of the measuring point on the object to be measured).

Because the design of coordinate measuring machines of the generic kind as well as the design of different linear guides and different linear measuring instruments are well known to skilled persons, it must be understood that numerous modifications and combinations of different features can be made. All of these modifications lie within the scope of the invention.

Figure 2:
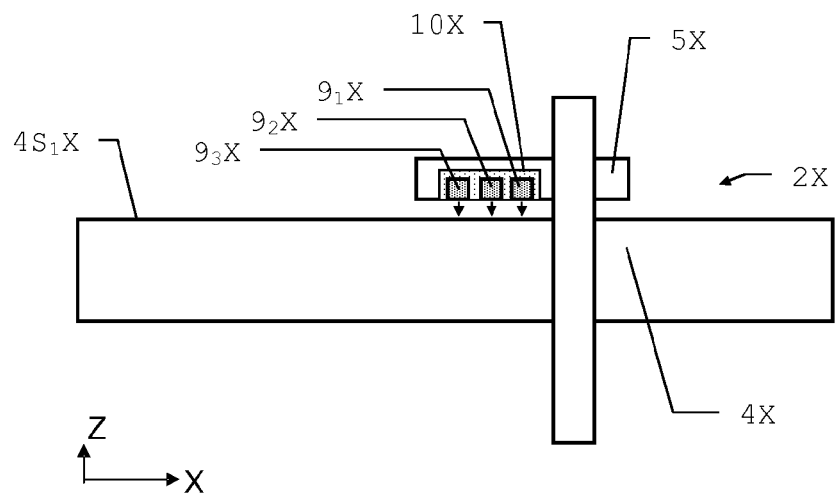
FIG. 2 schematically shows one linear drive mechanism (X-drive) comprising—according to the invention—a sensor-package with two displacement sensors, wherein the package is arranged on the X-carriage being linearly movable with respect to the bridge serving as guide.

FIG. 2 shows a linear drive mechanism 2X in the X direction according to the invention, wherein a sensor-package 10X comprising the displacement sensors $9_1X, 9_2X, 9_3X$ is arranged on the X-carriage (as the movable member 5X of the X-drive mechanism 2X). The X-carriage is supported for linear movement with respect to the bridge—which serves as linear guide 4X—by bearings.

In the shown linear X-drive mechanism 2X, the sensor-package 10X with its displacement sensors $9_1X, 9_2X, 9_3X$ is formed and arranged in such a way that the bearing distance between the X-carriage and the bridge (forming the X-beam or X-column) can be sensed. By taking into account the distances sensed by two displacement sensors $9_1X, 9_2X$ between the X-carriage and the guiding surface $4S_1X$ of the bridge, it is possible to measure an error translation (i.e. a translational displacement) in the Z direction but it will also be possible to measure the change in angle (i.e. a rotational displacement, which may be a pitching error) between the X-carriage and the X-beam, by taking the difference between the two sensor-outputs. If the output of the third sensor $9_3X$ is also considered, it will be possible to measure a translational displacement and two angles (e.g. a pitching and a yawing error). If—in addition to the three above mentioned sensors—two more displacement sensors sensing in the Y direction are added, it will be possible to measure the complete 6-DOF (six degrees of freedom) movement of the X-carriage towards the X-beam.

The above described arrangement of displacement sensors in the X-drive mechanism may alternatively or additionally also be applied for the other drive mechanisms of the CMM, namely the Y-drive mechanism (as exemplarily shown in FIG. 3) and/or the Z-drive mechanism.

Referring particularly to the Z-drive mechanism, the displacement sensors may preferably be fitted to the guide of the Z-drive mechanism, wherein the Z-guide may be formed by a cubical hole in the X-carriage member, through which the Z-column can be moved along the Z-axis. More specifically, the displacement sensors may be fitted to the guiding inner surfaces of the cubical hole in such a way, that distances (i.e. bearing distances) to respectively mutual facing surfaces of the Z-column (as the movable member) can be sensed.

Figure 3:
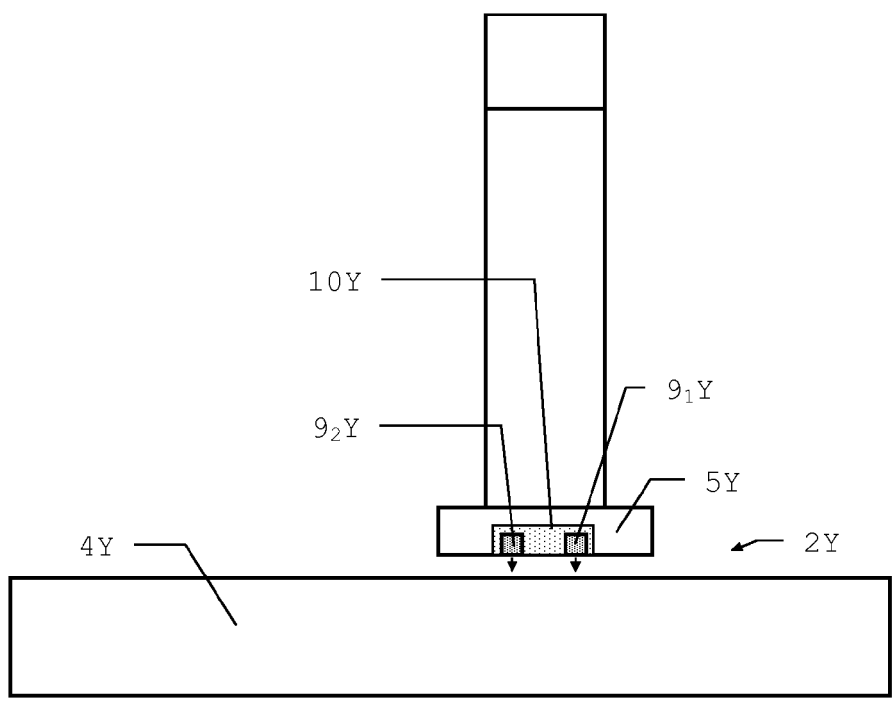
FIG. 3 schematically shows another linear drive mechanism (Y-drive) comprising—according to the invention—a sensor-package with three displacement sensors, wherein the package is arranged on the Y-carriage of the foot of bridge, the Y-carriage being supported for linear movement with respect to the measuring table serving as guide.

FIG. 3 shows another linear drive mechanism 2Y in the Y direction—according to the invention—with sensor-package 10Y and its integrated displacement sensors $9_1Y, 9_2Y$ arranged on the Y-carriage as the movable member 5Y of the drive mechanism 2Y, wherein the Y-carriage usually being part of one portal foot. The Y-carriage is supported for linear movement with respect to the measuring table by air bearings, wherein the measuring table—i.e. two surfaces of the table—serve as a guide 4Y for the Y-carriage. The air bearings may be built in a manner known per se, i.e. so that an air cushion is generated between mutually facing surfaces of the table and the carriage, wherein the air cushion supports the carriage for movability.

According to the invention, the displacement sensors $9_1Y, 9_2Y$ may be fitted to the Y-carriage similar to the arrangement of the displacement sensors of the X-drive mechanism on the X-carriage, as explained above in connection with FIG. 2.

In the shown case, the displacement sensors $9_1Y, 9_2Y$ are designed for measuring the distance between the Y-carriage (e.g. foot of portal) and the Y-axis guide formed by a part of the measurement table (including a table edge).

By fitting five sensors (e.g. being integrated into two sensor-packages) in the same way as explained in connection with FIG. 2, it will be possible to measure the 6-DOF movements between the Y-carriage and the Y-axis.

Figure 4:
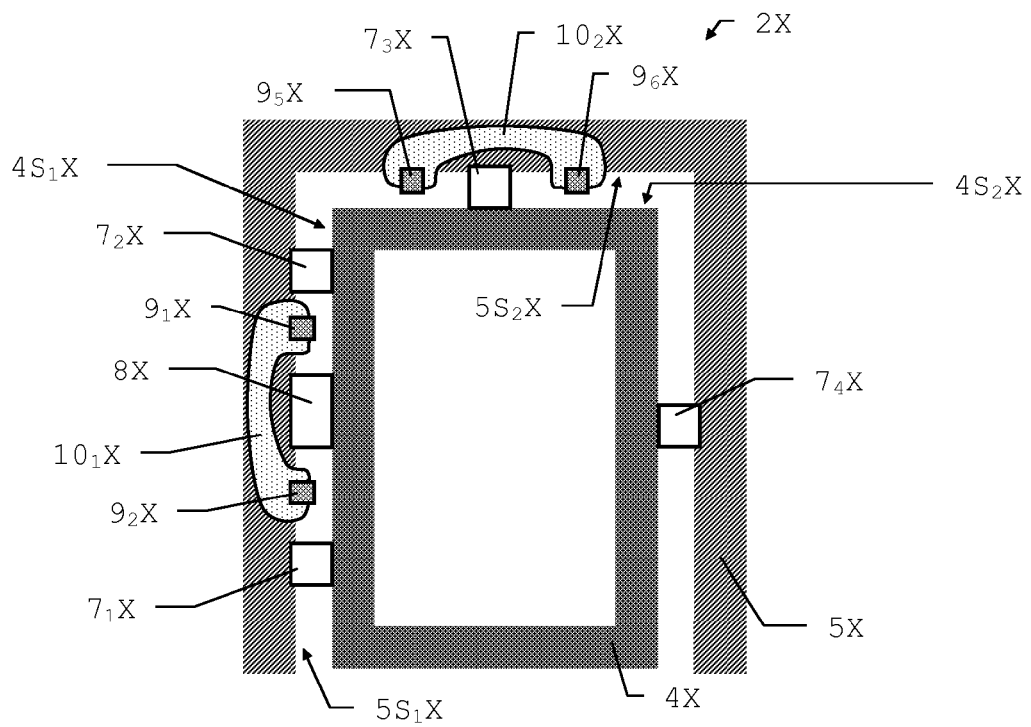
FIG. 4 shows a side view of a linear X-drive mechanism with a rectangular beam structure of the bridge serving as guide, where displacement sensors as parts of two sensor packages are arranged on the X-carriage being linearly movable with respect to the bridge.

FIG. 4 shows a side view of linear X-drive mechanism 2X with a rectangular beam structure of the bridge (or X-beam) serving as guide 4X, where a first sensor-package $10_1X$ comprising the displacement sensors $9_1X, 9_2X, 9_3X, 9_4X$ (where $9_3X, 9_4X$ are not depicted because of the perspective) and a second sensor-package $10_2X$ comprising the displacement sensors $9_5X, 9_6X$ are arranged on the X-carriage (as the movable member 5X) being supported for linear movability with respect to the bridge by air bearings $7_1X, 7_2X, 7_3X, 7_4X$.

Also schematically shown is a linear measuring instrument 8X for determination of the drive/travelling position of the X-carriage in the X direction. Therefore, a coded and readable scale—as part of the linear measuring instrument 8X—extends parallel to the X direction along the bridge.

According to the invention, the first sensor-package $10_1X$ is mounted to a first inner surface $5S_1X$ of the X-carriage and the second sensor-package $10_2X$ is fitted to a second inner surface $5S_2X$ of the X-carriage. The first and second surfaces $5S_1X, 5S_2X$ of the X-carriage face towards the outer surfaces $4S_1X, 4S_2X$ of the rectangular beam structure of the bridge. Hence, the outer surfaces $4S_1X, 4S_2X$ of the X-beam serve as guide 4X for the X-carriage, wherein air bearings $7_1X, 7_2X, 7_3X, 7_4X$ generate an air cushion between the respective mutually facing surfaces $4S_1X, 4S_2X, 5S_1X, 5S_2X$ in order to provide linearly guided movability of the X-carriage.

Each displacement sensor $9_1X, 9_2X, 9_3X, 9_4X, 9_5X, 9_6X$ is built for measuring a distance from the X-carriage to the respective surface of the X-beam in a direction being perpendicular to the travelling direction (X direction).

The sensed distances indicate displacements of the carriage from its ordinary bearing position. In detail, translational displacements in the Y and Z directions (i.e. horizontal and vertical straightness errors in the joints) and rotational displacements (i.e. pitching, yawing and rolling errors) can be indicated, determined and compensated for in connection with calculating the space coordinates of the measurement point.

Although FIG. 4 exemplarily shows a linear drive mechanism with a rectangular beam structure of the bridge, also other types of beam structures may alternatively be applied. For example, the axes/beams of the drive mechanism may alternatively be triangular, cylindrical or any other shape which allows for linearly guided movability, as known to a skilled person.

Figure 5:
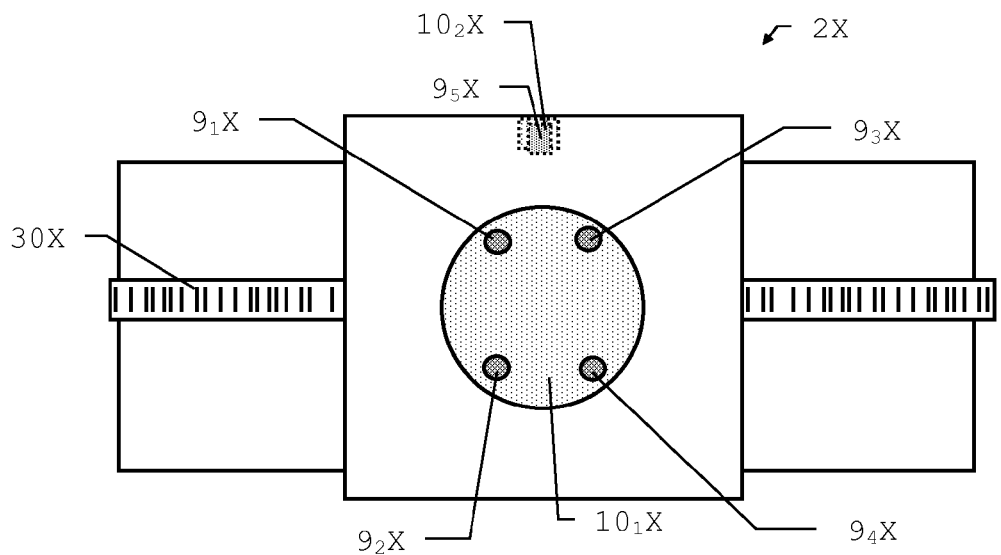
FIG. 5 shows a front view of the linear X-drive mechanism of FIG. 4.

In FIG. 5, a front view of the linear X-drive mechanism 2X of FIG. 4 is represented.

The four circularly depicted displacement sensors $9_1X, 9_2X, 9_3X, 9_4X$ being part of the first sensor-package $10_1X$ and being attached to the X-carriage measure distances in the Y direction between the X-carriage and the surface of the rectangular beam structure laying in the XZ-plane. The distances indicate a displacement of the carriage in the Y direction (horizontal straightness error) as well as displacement angles between the X-carriage and the XZ-plane.

The two displacement sensors $9_5X, 9_6X$ (whereof only one sensor $9_5X$ is visible in FIG. 5) being part of the second sensor-package $10_2X$ and being placed on the top of the X-carriage (depicted with broken lines) measure the distances between the X-carriage and the top-surface of the rectangular beam structure which lays in the XY-plane. The distances are measured in the Z direction and indicate a displacement of the carriage in the Z direction (vertical straightness error) as well as a displacement angle between the X-carriage and the XY-plane.

Usually, the X-carriage may be made of aluminium or steel/iron and has wall-thickness and stiffness adapted to the load. An ordinary material of the X-beam (bridge) may be aluminium, granite, ceramics or steel/iron.

The two most common types of bearings between the movable members and the guides are air bearings or mechanical bearings (e.g. linear circulating plus rails). The air bearings give the advantage that there is no friction in the movement (which may introduce different kind of errors like angle errors or hysteresis). The disadvantage of air bearings is that the stiffness is normally lower than in mechanical bearings, so that particularly dynamic errors may occur. In mechanical types, the stiffness in the bearing system is normally higher but there is friction and the friction forces may introduce errors. However, the invention may be applied for both types of bearings.

If the system is fitted with air bearings, the bearings may particularly be placed roughly where the displacement sensors are located in FIG. 5. This means, in practical terms, that the bearings should be spread out as much as possible so that the baseline between the bearings will be as long as possible. Such an arrangement of the bearings and displacement sensors may maximize the stiffness for a given footprint.

Therefore, one easy way of arranging the sensor-packages may be by fitting them on the carriage close to the air bearings (or—in case of mechanical bearings—close to the circulating balls).

When the X-carriage is moving along the X-beam, the complete 6-DOF movement of the X-carriage may thus be measured. Particularly, the scale 30X of the linear measurement instrument 2X is used to measure the travelling position in the X direction, the two displacement sensors $9_5X, 9_6X$ on the top of X-carriage indicate the vertical straightness (displacement in the Z direction) and the X-pitch (angle between the X-carriage and the XY-plane), the four circularly depicted displacement sensors $9_1X$, $9_2X, 9_3X, 9_4X$ indicate the horizontal straightness (displacement in Y direction) and the X-yaw (angle between the carriage and the XZ-plane) and a combination of the five displacement sensors $9_1X$, $9_2X$, $9_3X, 9_4X, 9_5X$ indicate the X-roll (rotation around the x-axis).

The above described arrangement of displacement sensors is exemplarily shown referring to the X-drive mechanism of the CMM. However, it may also or alternatively be applied for the other drive mechanisms, namely the Y-drive mechanism and/or the Z-drive mechanism.

Applying such a setup—according to the invention—allows for improved compensation of weaknesses in the bearings/joints of the CMM.

Figure 6:
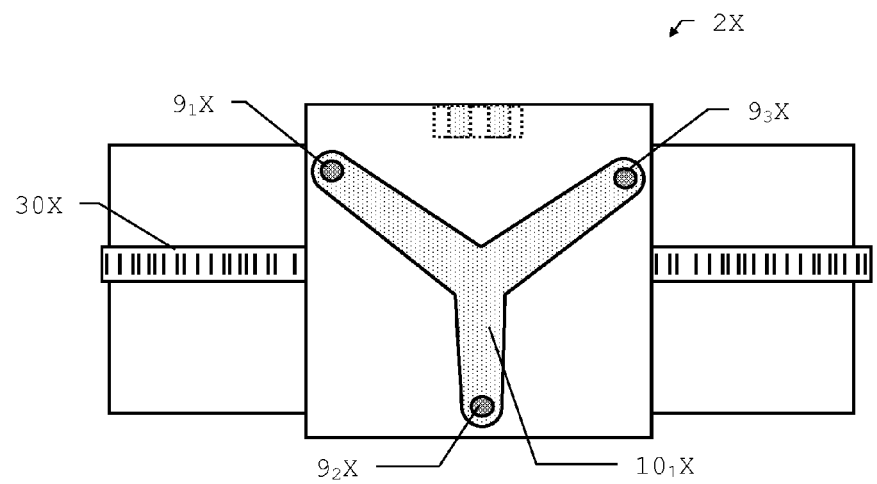
FIG. 6 shows—similarly to FIG. 5—another front view of a linear X-drive mechanism with an alternative embodiment for the sensor-package.
Figure 7:
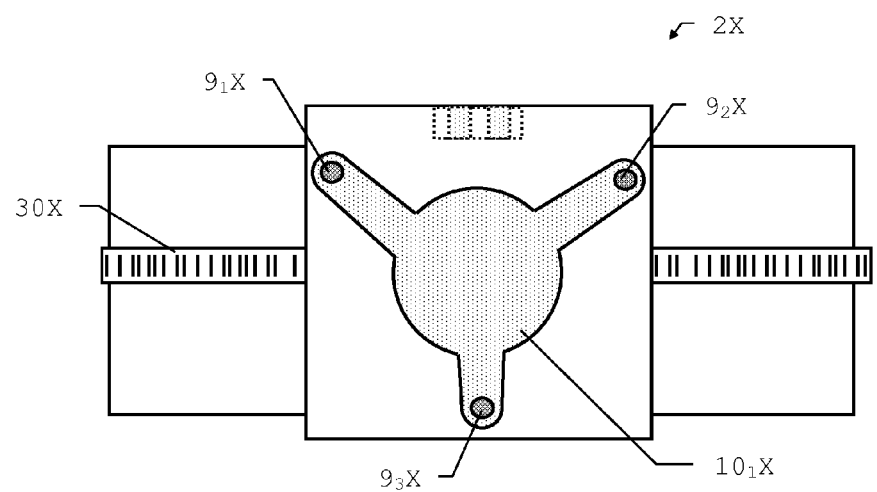
FIG. 7 shows—similarly to FIG. 5—another front view of a linear X-drive mechanism with an alternative embodiment for the sensor-package.

FIGS. 6 and 7 show—similarly to FIG. 5—further front views of a linear X-drive mechanism 2X with an alternative embodiment and design of the sensor-package.

In FIG. 6, the housing of the sensor-package $10_1X$ rigidly interconnects the three displacement sensors $9_1X, 9_2X, 9_3X$ by a frame structure built up from three spoke-like converging bracing struts. The struts may consist of or comprise invar or carbon fiber material, so as to allow for high geometrical stability and constant spatial relationship of the displacement sensors $9_1X, 9_2X, 9_3X$ relative to each other.

The embodiment of the sensor-package $10_1X$ shown in FIG. 7 is very similar to the embodiment of FIG. 6, except that the housing is designed slightly different. The embodiments shown in FIGS. 6 and 7 enable to optimize the compromise between the issue that the sensors should be placed on the carriage as far away from each other as possible in order to increase the accuracy for sensing displacements of the carriage and the issue that the sensors should be placed as closed to each other so as to allow for best geometrical stability between the sensor elements (i.e. so as to precisely being aware of the spatial relationship of the sensors relative to each other).

FIG. 8 shows—similarly to FIG. 5—another front view of a linear X-drive mechanism 2X with an alternative embodiment and manner of arrangement of the displacement sensors $9_1X, 9_2X, 9_3X$. In the shown case, the circularly depicted displacement sensors $9_1X, 9_2X, 9_3X$ are again integrally built as one pre-calibrated sensor-package/component 10X with three sensor elements $9_1X, 9_2X, 9_3X$. Similarly, also the displacement sensors on the top of the X-carriage are integrally designed as one package with two sensor elements. The sensor elements are exemplarily designed as capacitive or optical sensor elements. Such sensor elements may allow for easily achieving a high sensitivity and accuracy.

As explained in more detail above, the advantages with pre-calibrated integral sensor-packages 10 having two or three displacement sensor elements are—among others—that they may be less sensitive to weakness in the carriage itself and the assembly and calibration of the sensor packages—compared to the assembly of individual displacement sensors—may demand less effort.

One practical solution to achieve an improved dynamic performance is described as follows.

For performing an error mapping (i.e. a calibration with regard to geometrical errors), as known in the state of the art, a special calibration measuring equipment may be fitted on the machine in order to measure the 6-DOF movements. Then the machine is run to measure a number of positions along each axis, wherein for each measuring point a detection of linear straightness (in two directions orthogonal towards the moving direction), pitch, yaw and roll will be carried out. This procedure will be done for each axis, and also a measurement of the orthogonality between the axes.

Additionally, according to the invention, for each calibration position, the measurement values of the displacement sensors will be added to a calibration table.

Hence, in a later use of the CMM, the error components achieved by looking at the difference between the calibrated displacement sensor values and the actual displacement sensor values will be employed in order to compensate for actual geometrical errors (which may i.e. be unrepeatable errors).

FIG. 9 shows a side view of a bridge-type CMM 1 according to the invention.

As explained above in more detail, the Y- and X-drive mechanisms 2X,2Y each comprises two sensor packages $10_1X$, $10_2X, 10_1Y, 10_1Y$ with several displacement sensors, wherein the x-drive-sensor-packages $10_1X, 10_2X$ are placed closely to the air bearings $7_1Y, 7_2Y, 7_3Y, 7_4Y$.

The outputs of the displacement sensors in the Y-drive mechanism 2Y are used for indicating and determining translational and rotational displacements around the Y-axis. In the shown example, there are three displacement sensors that measure distances between the portal foot and the XY-surface of the measurement table. Furthermore, there are two displacement sensors measuring distances between the foot and the YZ-surface of the measurement table. However, alternatively to the design and arrangement of the sensor-packages shown in FIG. 9, the sensor-packages of the Y-drive mechanism 2Y may also be designed similarly to one of the designs shown and explained in FIGS. 5 to 8.

Figure 10:
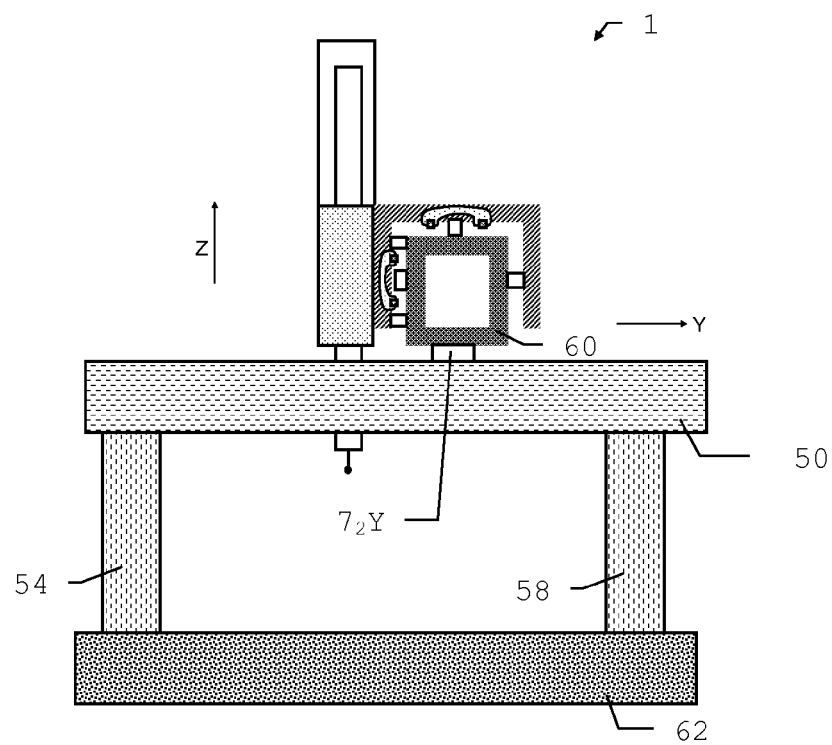
FIG. 10 shows a side view of a gantry-type CMM, according to the invention, with sensor-packages in the linear drive mechanism.
Figure 11:
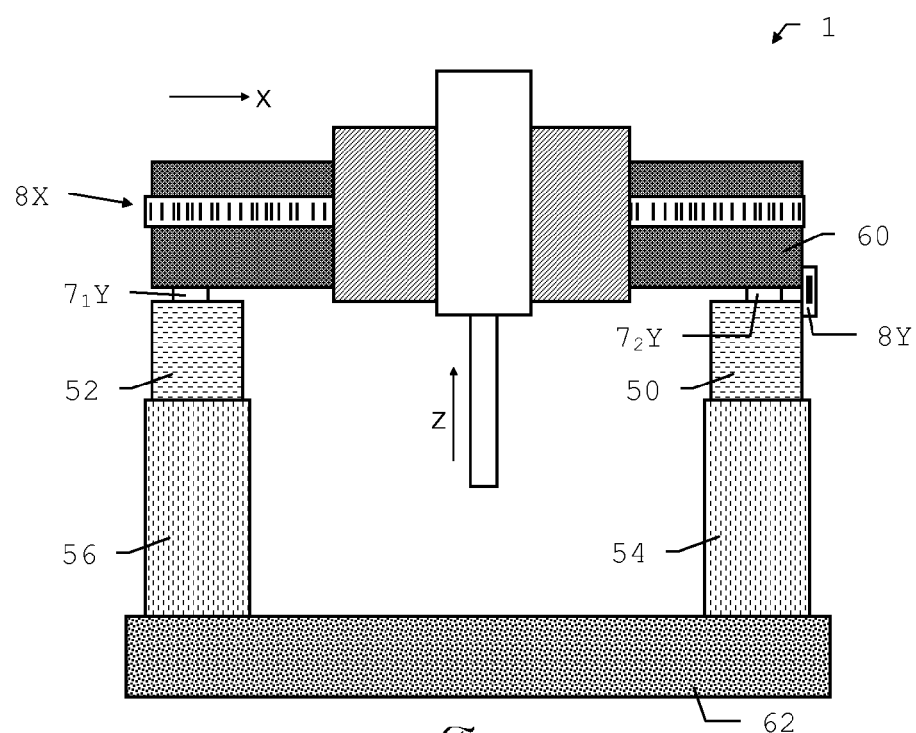
FIG. 11 shows a front view of the gantry-type CMM of FIG. 10.

FIG. 10 shows a side view and FIG. 11 a front view of a gantry-type CMM 1 according to the invention, wherein displacement sensors are arranged exemplarily at least in the linear X-drive mechanism.

As shown, a gantry-type CMM does not have movable legs/feet between the Y/W- and X-axis (or at least they are very short). The X-beam 60 is directly (i.e. without or with only very short feet) supported for movement by bearings $7_1Y, 7_2Y$ in the Y direction along Y- and W-beams 50,52 which are carried by four pillars 54,56,58. The pillars are rigidly mounted on a measurement table 62, as known per se to a skilled person. Furthermore, there exist linear measuring instruments 8X,8Y in the X-, Y/W- and Z-drive mechanisms (for the sake of simplicity only shown in the X- and Y/W-drive mechanisms).

According to the inventive idea, the measurement of and compensation for the dynamic movements/geometrical errors between the moving members and the guides of the X-, Y/W- and Z-drives may accordingly be carried out using displacement sensors as described above in connection with the bridge-type CMM.

Although the invention is illustrated above, partly with reference to some preferred embodiments, it must be understood that numerous modifications and combinations of different features of the embodiments can be made. All of these modifications lie within the scope of the appended claims.

What is claimed is:

1. A coordinate measuring machine for determination of at least one space coordinate of a measurement point on an object to be measured, comprising:
   a stationary base;
   a probe head being moveable relative to the base;
   at least one linear drive mechanism for provision of movability of the probe head relative to the base in a first direction, the linear drive mechanism including:
      a linear guide in the first direction;
      a movable member being supported for movement along the linear guide by bearings provided between mutually facing surface of the linear guide and the moving member; and
      a linear measuring instrument for determination of a first drive position of the movable member in the first direction in parallel to the linear guide;
      a calculation unit for determination of the space coordinate as a function of at least the first drive position;
      at least a first pre-calibrated integral sensor-package having at least two displacement sensors each being built for measuring a distance from the movable member to the linear guide in a direction being non-parallel with respect to the first direction, in particular bearing distances between mutually facing surfaces of the movable member and the linear guide, wherein:
         the first pre-calibrated integral sensor-package comprises a common housing for rigidly joining together the displacement sensors with a precisely known spatial and geometrical relationship of the displacement sensors relative to each other and the first integral sensor package is built modular and forms a one-piece, coherent component in such a way that it is mountable to and removable from the coordinate measuring machine en bloc;
         the sensed distances indicate a translational displacement of the movable member from an ordinary bearing position in a direction perpendicular to the first direction; and a rotational displacement of the movable member; and
         the space coordinate is determined by the calculation unit is further dependent on the indicated displacement.

2. The coordinate measuring machine according to claim 1, wherein the displacement sensors are built as optical, capacitive or inductive displacement sensor.

3. The coordinate measuring machine according to claim 1, wherein the bearings are built as air bearings.

4. The coordinate measuring machine according to claim 1, wherein the linear guide comprises a first and a second surface building an edge extending in parallel to the first direction, wherein the movable member having first and second surfaces mutually facing towards the two surfaces of the linear guide, particularly wherein an air cushion being between the mutually facing first surfaces and the mutually facing second surfaces.

5. The coordinate measuring machine according to claim 4, wherein the first pre-calibrated integral sensor-package comprises three displacement sensors and is arranged on the first inner surface of the movable member for measuring three distances from the first inner surface of the movable member to the first outer surface of the guide.

6. The coordinate measuring machine according to claim 5, wherein
   a second integral sensor-package including at least two displacement sensors is arranged on the second surface of the movable member for measuring two distances from the second surface of the movable member to the second surface of the guide;
   the distances sensed by the displacement sensors of the first and second integral sensor packages indicate:
      two translational displacements of the movable member from an ordinary bearing position in two directions of which one being perpendicular to the first inner surface and the other being perpendicular to the second inner surface of the movable member; and
      three rotational displacements of the movable member about three axis of which one axis being parallel to the first direction, one axis being perpendicular to the first inner surface and one axis being perpendicular to the second inner surface of the movable member; and
   the space coordinate is determined further dependent on the two translational and three rotational displacements.

7. The coordinate measuring machine according to claim 1, wherein the housing of the sensor-package comprises a frame structure built up from bracing struts so as to allow for high geometrical stability and constant spatial relationship of the displacement sensors relative to each other.

8. The coordinate measuring machine according to claim 1, wherein the housing of the sensor-package comprises a frame structure built up from bracing struts, and the housing or the frame structure consists of, or comprises, invar or carbon fiber material, so as to allow for high geometrical stability and constant spatial relationship of the displacement sensors relative to each other.

9. The coordinate measuring machine according to claim 1, wherein the coordinate measuring machine is built for determination of three space coordinates of the measurement point and comprises:
   three linear drive mechanisms for provision of movability of the probe head relative to the base in the first, a second and a third direction each linear drive mechanism including:
      a linear guide in the first, the second respectively the third direction;
      a movable member being supported for movement along the guide by bearings;
      a linear measuring instrument for determination of the first, a second or a third drive position, respectively, of the movable member in the first, the second or the third direction in parallel to the linear guide, respectively, and at least one pre-calibrated integral sensor package including at least two displacement sensors, for indicating at least one translational and one rotational displacement of the movable member from an ordinary bearing position, wherein the calculation unit is designed for determining the three space coordinates as a function of the first, the second and the third drive position and the sensed displacements of each moving member.

10. The coordinate measuring machine according to claim 9, wherein at least one pre-calibrated integral sensor package including at least two displacement sensors, is designed for indicating two translational and three rotational displacements, of the movable member from an ordinary bearing position.

11. The coordinate measuring machine according to claim 1, wherein the coordinate measuring machine is designed according to one of the following styles:
bridge-type;
L-bridge-type;
horizontal-arm-type;
cantilever-type; or gantry-type.

12. The coordinate measuring machine according to claim 1, wherein:
a contact probe, or a non-contact probe, capacitance probe, or inductance probe, is arranged on the probe head and/or
the base comprises a table with a granite surface plate for supporting the object to be measured.

13. The coordinate measuring machine according to claim 1, wherein:
a scanning, touch trigger probe, or an optical probe is arranged on the probe head.

14. The coordinate measuring machine according to claim 1, wherein at least the first pre-calibrated integral sensor-package includes at least two displacement sensors each being built for measuring bearing distances between mutually facing surfaces of the movable member and the guide.

15. A method of compensating errors in a coordinate measuring machine, which determines at least one space coordinate of a measurement point on an object to be measured, the coordinate measuring machine including at least one linear drive mechanism for provision of movability of a probe head in a first direction, with a linear guide in the first direction, a movable member being supported for movement along the guide by bearings, and a linear measuring instrument for determining a first drive position of the movable member in the first direction in parallel to the linear guide, the method comprising:

measuring at least two distances from the movable member to the guide in a direction being non-parallel with respect to the first direction by using at least a first pre-calibrated integral sensor-package having at least two displacement sensors, the two distances being bearing distances between mutually facing surfaces of the movable member and of the guide, wherein the sensed distances indicate at least an actual translational displacement of the movable member from an ordinary bearing position in a direction perpendicular to the first direction as well as a rotational displacement of the movable member; and compensating the errors by using at least the determined actual displacements of the movable member.

16. The method according to claim 15, wherein the errors include weaknesses in the bearings.

17. A method of determining at least one space coordinate of a measurement point on an object to be measured using a coordinate measuring machine including at least one linear drive mechanism for provision of movability of a probe head in a first direction, with a linear guide in the first direction, a movable member being supported for movement along the guide by bearings, and a linear measuring instrument for determination of a first drive position of the movable member in the first direction in parallel to the linear guide, wherein the space coordinate is determined as a function of at least the first drive position and wherein errors are compensated by the method according to 15.

* * * * *